Jan. 24, 1939.  R. B. HEARN  2,144,843
SYSTEM AND METHOD OF DETERMINING DISTANCE
Filed April 7, 1936
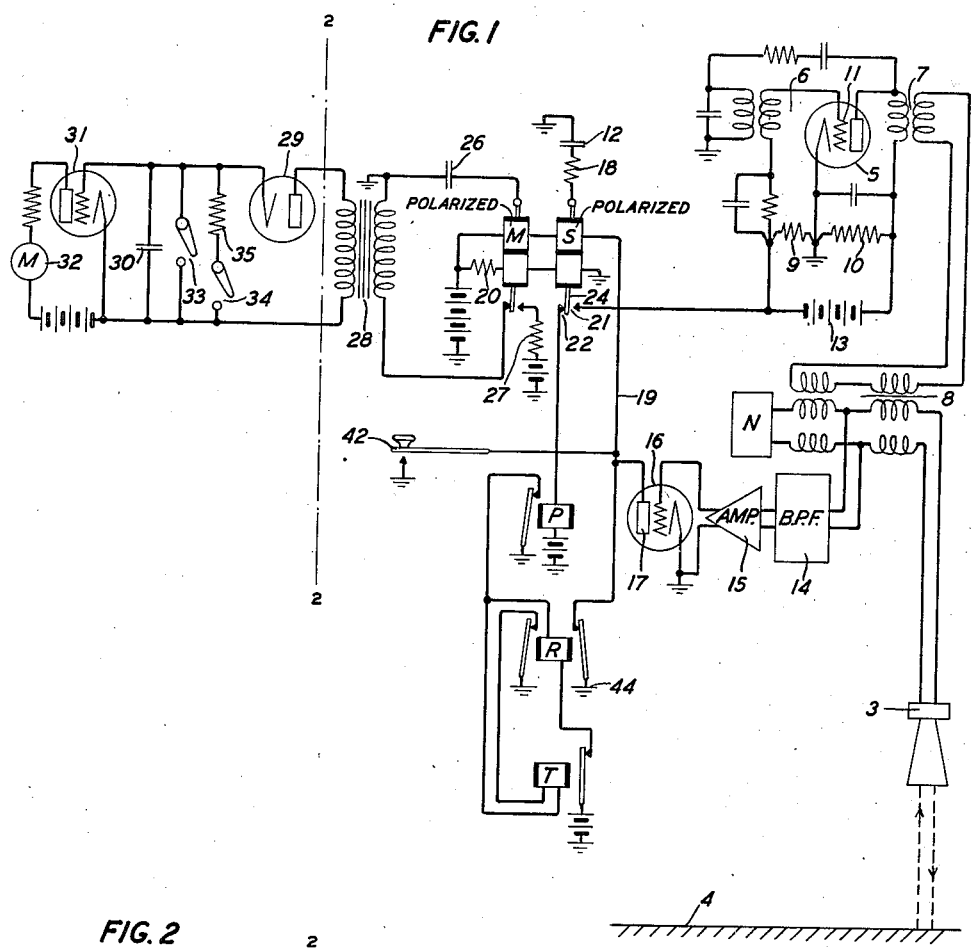
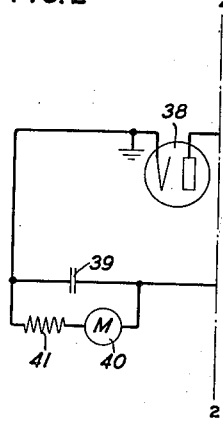
INVENTOR
R.B.HEARN
BY
B.H.Jackson
ATTORNEY Patented Jan. 24, 1939

2,144,843

UNITED STATES PATENT OFFICE 2,144,843

SYSTEM AND METHOD OF DETERMINING DISTANCE

Richard B. Hearn, Hollis, N. Y., assignor to Bell Telephone Laboratories, Incorporated, New York, N. Y., a corporation of New York Application April 7, 1936, Serial No. 73,116

4 Claims. (Cl. 177—352)

This invention relates to the determination of distances by means of longitudinal waves and has for an object to measure distances, particularly relatively short distances, accurately and precisely.

One of the hazards of aeronautics that has commanded consideration in recent years is the difficulty incident to the landing of airplanes when atmospheric visibility is poor.

It has long been known that distances may be ascertained by the production of sound waves, and the determination of the period required for these waves to travel to and return from a reflecting surface. Since the time which elapses between the emission of the waves and their reception after reflection is directly correlated with the distance between the source and the reflecting surface, long distances may be easily estimated. However, short distances are difficult to ascertain, due to the short interval between the emission of the waves and their reception after reflection.

In accordance with this invention, longitudinal vibrations which produce waves such as audible or superaudible waves are employed to measure relatively short distances, such as the height of an airplane above the earth's surface. For example, an airplane may be provided with a source of sound waves, which waves are reflected by the earth's surface back to the airplane to a suitable receiving device. This invention provides means for producing a current or voltage, the magnitude of which is proportional to the elapsed time required for the transmitted wave to reach the receiver after reflection from the earth's surface and which is, therefore, proportional to the altitude of the airplane. A preferred way of producing this result is to start charging a condenser through a high resistance at the instant the wave train is transmitted and to stop the charging of the condenser the instant the wave is received after reflection from the earth's surface, so that the magnitude of the charge on the condenser is proportional to the altitude of the airplane. The charge on the condenser is then measured, for example, by discharging the condenser through the primary winding of a transformer having a second condenser and a rectifier connected in series with its output winding. The voltage on this second condenser may be used to control the grid voltage of a vacuum tube amplifier having a direct current measuring instrument in its output circuit. It will be apparent that the reading of the meter will be proportional to the altitude of the airplane above the ground.

Referring to the drawing:

Fig. 1 represents a schematic altitude indicator for airplanes; and

Fig. 2 is a modification of Fig. 1.

The apparatus of Fig. 1 is adapted to be mounted in an airplane to enable its altitude to be readily determined. The numeral 3 represents an instrumentality such as a moving coil type loud-speaker with an exponential horn which serves to transmit and receive longitudinal waves, such as sound waves, employed in the determination of the height of the airplane above the earth 4. It will be apparent that when a sound of short duration is emitted by loud-speaker 3, the sound wave after striking the earth or other bounding surface will be reflected and part of the reflected wave will be received by loud-speaker 3 so that the time which elapses between the emission of the sound wave by loud-speaker 3 and its reception after reflection is proportional to the altitude of the airplane above ground. This invention, as exemplified in Fig. 1, provides means for producing a voltage the magnitude of which is proportional to this elapsed time and the deflection of the meter for measuring this voltage will be a direct indication of the altitude of the airplane.

The source of audible or superaudible frequency oscillations employed in the altitude measurement may comprise a conventional reverse feedback oscillator 6 comprising a space discharge device 5 connected to loud-speaker 3 by means of a transformer 7 through the hybrid coil 8. This type of oscillator is illustrated, for example, in Fig. 11 of an article entitled "Constant frequency oscillators" by F. B. Llewellyn published in the Proceedings of the Institute of Radio Engineers for December 1931, vol. 19, pages 2063 to 2094. The voltage drop across a resistance 9 in the input of space discharge device 5, caused by the flow of current through the serially connected resistances 9 and 10 ordinarily affords sufficient bias on the control electrode to prevent the tube from oscillating. The means for temporarily making the potential of grid 11 sufficiently less negative to permit tube 5 to oscillate is secured in Fig. 1 by permitting the charge on a condenser 12 to discharge through resistance 9 in such a manner as to neutralize in part, at least, the IR drop in resistance 9 due to battery 13.

For the purpose of describing the operation of the arrangement of Fig. 1, it may be assumed that oscillator 6 has been made operative for a short interval of time to cause loud-speaker 3 to emit a train of sound waves which, after reflection from the earth's surface is again received by loud-speaker 3 and impressed through a band-pass filter 14 upon a suitable amplifier 15. Amplifier 15 is coupled to the input of a vacuum tube 16, the output circuit of which may be traced from anode 17, conductor 19, upper winding polar relay S, upper winding polar relay M, battery and ground, back to the filament of tube 16. The reflected wave after amplification by amplifier 15 is sufficient to cause appreciable space current to flow in tube 16 and thereby cause polar relays S and M to move their armatures against their left contacts as shown in Fig. 1.

The movement of the armature of polar relay S against its left contact 22 establishes a circuit from positive battery, winding of relay P, left contact 22 of relay S, resistance 18 and condenser 12 to ground so that the closure of this circuit by relay S serves to charge condenser 12 through the winding of relay P. This charging current serves to operate relay P to close its contacts and energize relay R by closing a circuit from battery, contact of relay T, winding of relay R and contact of relay P to ground. Relay R in closing its right contact serves to connect ground to conductor 19 to establish a temporary holding circuit for relays M and S after the amplified reflected impulse has ceased. Relay R in closing its left contact establishes a circuit from battery, contact of relay T, winding of relay S again causes relays P, R and T to operate in the manner previously described to permit condenser 12 to subsequently discharge through resistance 9 of the oscillator to cause another short train of audio frequency oscillations to be generated.

From the above description, it is apparent that each time the armature of relay S is moved to close its right contact 21, a train of sound waves is emitted by loud-speaker 3 and the said armature remains on contact 21 until the sound wave after reflection from the earth's surface has lowered the impedance of the space current path of tube 16 to cause the armature of polar relay S to move against its left contact 22. The length of time that armature 24 remains against contact 21 is, therefore, proportional to the altitude of loud-speaker 3 above the reflecting surface 4. This time interval may be measured as follows:

Polar relay M is similar to polar relay S, and it will be apparent that relay M will operate in the same manner as relay S and simultaneously therewith. When relay S closes its right contact 21 to render oscillator 6 operative, relay M closes its right contact to close a charging circuit for a condenser 26, which circuit may be traced from battery, high resistance 27, right contact relay M and condenser 26 to ground. As soon as the reflected sound wave has caused relay S to close its left contact 22, relay M also opens its right contact and closes its left contact. The voltage on condenser 26 therefore depends voltage on condenser 26 is shown in Fig. 2. In this figure, the output of transformer 28 is impressed through a rectifier 38 to charge a condenser 39. The voltage on condenser 39 is applied to a meter 40 through a resistance 41 which furnishes a leakage path for the charge on condenser 39 and permits an accurate indication of the altitude without the manipulation of any reset key, such as key 33 of Fig. 1.

With respect to the relays employed it may be observed that relays R and T could be eliminated and the contact of relay P connected directly to conductor 19 providing relay P could be made very fast to operate and slow to release. Since such a combination is difficult to obtain in one relay, relay P is made fast operate and the slow release feature is obtained by adding relays R and T as shown in the drawing. It will be apparent that the general object of relays P, R and T is to permit condenser 12 to receive a full charge through relay P before ground 44 has been removed from conductor 19. Relay P may release before condenser 12 is fully charged but the charging will continue while relay T operates and relay R releases.

It will be apparent from Fig. 1 that balancing network N is connected to hybrid coil 8 in the usual manner to prevent any of the output current from oscillator 6 from being received directly by receiving amplifier 15 without first having been impressed on loud-speaker 3 and reflected back into loud-speaker 3. Band-pass filter 14 may be designed to exclude all frequencies except the frequency or narrow band of frequencies generated by oscillator 6. Meter 32 or meter 40 may be of any suitable type, such as a direct current microammeter.

It will be understood that the duration of each train of waves from source 6 should be short compared to the time required for the sound waves to travel from loud-speaker 3 to the earth and back to loud-speaker 3.

The embodiments of the invention described above are for illustrative purposes since the invention is capable of other forms commensurate with the scope of the invention as defined in the appended claims.

What is claimed is:

1. An altimeter comprising an oscillator arranged to generate audio frequency waves but normally inoperative, a device for translating said waves into sound waves, means for rendering said oscillator operative for a predetermined relatively short interval of time, a receiving device responsive to said sound waves after reflection from the earth's surface for wholly controlling said means, a condenser, means controlled by the receiving device for charging said condenser to a potential substantially proportional to the time required for said waves to travel from the earth's surface to said receiving device and an instrument for measuring the potential of said condenser.

2. In a time measuring system, a first means for producing and directively emitting a sound pulse comprising a tube oscillator including a cathode and a control electrode, the pulse duration being short relative to the time interval included between the emission of the pulse and its return from a given reflecting surface, a second means controlled only by the pulse received after reflection from said surface for rendering said control electrode negative with respect to the cathode after emission and continuously during propagation of the pulse and positive shortly after reception of the pulse, a condenser, and a third means controlled by the second means for charging said condenser continuously during said time interval and only during said interval, and indicating means for measuring the charge of said condenser.

3. A system for measuring time or distance comprising a normally inoperative audio frequency tube oscillator having an input circuit and an output circuit, a device connected to the output circuit for transmitting a pulse produced by said oscillator and receiving said pulse after reflection from a surface, a condenser, means connected to the device and actuated by the received pulse for charging the condenser and upon charge of said condenser for simultaneously discharging the condenser and applying the decreasing condenser voltage to the terminals of the input circuit whereby the oscillator is rendered operative during only the discharge period of the condenser and a short pulse of predetermined duration is emitted by the device, and means controlled by the received pulse for measuring and indicating the time interval included between the emission and return of the pulse.

4. In a system for measuring time or distance, a tube oscillator having an input circuit and an output circuit, a device connected to the output circuit for transmitting waves produced by said oscillator and receiving said waves after reflection from a given surface, a first condenser, a second condenser, a relay, a voltage means connected in series with said relay and the first condenser, a voltage measuring means including a discharge path connected in circuit with the second condenser, a switching means controlled by and actuated upon deenergization of said relay for disconnecting the first condenser and the voltage means and the second condenser and the measuring means and simultaneously therewith for connecting the second condenser in series with the voltage means and the first condenser in shunt with a portion of the oscillator input circuit whereby said first condenser discharges and said oscillator is rendered operative during only the discharge period of the first condenser, and a second means connected to said device and actuated by the energy received thereby for restoring the switching means to normal.

RICHARD B. HEARN.